United States Patent [19]
Wallace

[11] Patent Number: 5,626,345
[45] Date of Patent: May 6, 1997

[54] DUAL GROOVE SEAL

[75] Inventor: Robert B. Wallace, Corpus Christi, Tex.

[73] Assignee: Rineer Hydraulics, Inc., Corpus Christi, Tex.

[21] Appl. No.: 494,479

[22] Filed: Jun. 26, 1995

[51] Int. Cl.$^6$ ........................................... F16J 9/20
[52] U.S. Cl. .................. 277/1; 277/9; 277/206 A; 29/402.02; 29/402.03
[58] Field of Search .................. 277/9, 206 A; 29/402.02, 402.03

[56] References Cited

U.S. PATENT DOCUMENTS

| | | | |
|---|---|---|---|
| 3,866,813 | 2/1975 | Arnold | 277/9 |
| 4,557,487 | 12/1985 | Banas et al. | 277/206 A |
| 5,190,078 | 3/1993 | Stoll et al. | 277/58 |

*Primary Examiner*—William A. Cuchlinski, Jr.
*Assistant Examiner*—Christina Annick
*Attorney, Agent, or Firm*—Fulbright & Jaworski

[57] ABSTRACT

A method and apparatus for reducing the wear within a mechanical apparatus having first and second adjacent, sealable surfaces which move relative to each other and having a seal between them.

5 Claims, 2 Drawing Sheets

DUAL GROOVE SEAL

BACKGROUND OF THE INVENTION

Seals seated in machined grooves have long been used to affect a sealing surface within mechanical apparatus. Typical of such seals are quad ring seals, spring loaded lip seals or even o-rings that seal an annulus defined by concentric cylindrical surfaces. In such an arrangement, the seal is typically seated in a groove machined within either or both of the annular surfaces, and the seal forms a complete seal within the annulus.

Often, the two surfaces defining the space sealed by the seals move relative to each other, typically by rotation such as a rotating shaft displaced within a stationary cylinder. Over time, the surfaces may wear where they are in contact with the seal because of friction caused by the relative movement. Such wear can cause leakage along the surfaces in contact with the seal. Such wear and resulting leakage is expensive to repair, typically requiring the apparatus in question to be removed from service and the part bearing the worn surface to be completely replaced or resurfaced, processes which are labor intensive.

The two surfaces defining the space sealed by the seals may become polished by extended rotation, causing a smoother surface that may be incompatible with a particular seal. For example, quad ring seals are typically compatible with a surface of finish 24 to 32 Ra, and spring loaded lip seals are compatible with a surface finish of 14 to 18 Ra. The contact of a seal against a shaft will over time increase smoothness beyond the range of the seal, resulting in leakage. To merely replace the seal is ineffective because the smoothness of the worn shaft is not compatible with the new seal.

SUMMARY OF THE INVENTION

It is an object of the present invention to reduce the need to replace or resurface parts of apparatus that move relative to a seal. It is a further object of the present invention to facilitate quick repair of fluid leaks around a seal.

To achieve the foregoing objects there is disclosed a method reducing wear within a mechanical apparatus having first and second adjacent, sealable surfaces which move relative to each other, one or both of the surfaces defining a plurality of adjacent grooves, comprising the steps of placing a seal within a first of the plurality of adjacent grooves whereby a seal is formed between the first and second adjacent surfaces while leaving an adjacent groove empty, and when the seal fails removing the seal from the first of the plurality of adjacent grooves, and placing a seal in one of the adjacent grooves.

Still a further objection of the present invention is the method in which the first and second surfaces comprise concentric cylindrical surfaces.

Still a further object of the present invention is the method in which the seal is a quad ring seal.

Still a further object of the present invention is a sealing apparatus consisting essentially of first and second adjacent surfaces defining a space between themselves, one or both of the adjacent surfaces defining a plurality of adjacent grooves for receiving a seal; and a seal positioned in only one of the grooves.

Still a further object of the present invention is the apparatus in which the surfaces comprise concentric cylindrical surfaces.

Still a further object of the present invention is the apparatus in which the single seal is a quad ring seal.

DETAILED DESCRIPTION OF THE INVENTION AND PREFERRED EMBODIMENT

The invention may be applied in any mechanical apparatus in which two adjacent surfaces separated by a seal move relative to each other. For purposes of illustration, the invention will be described herein in its preferred embodiment in a hydraulic motor.

Figure 1:
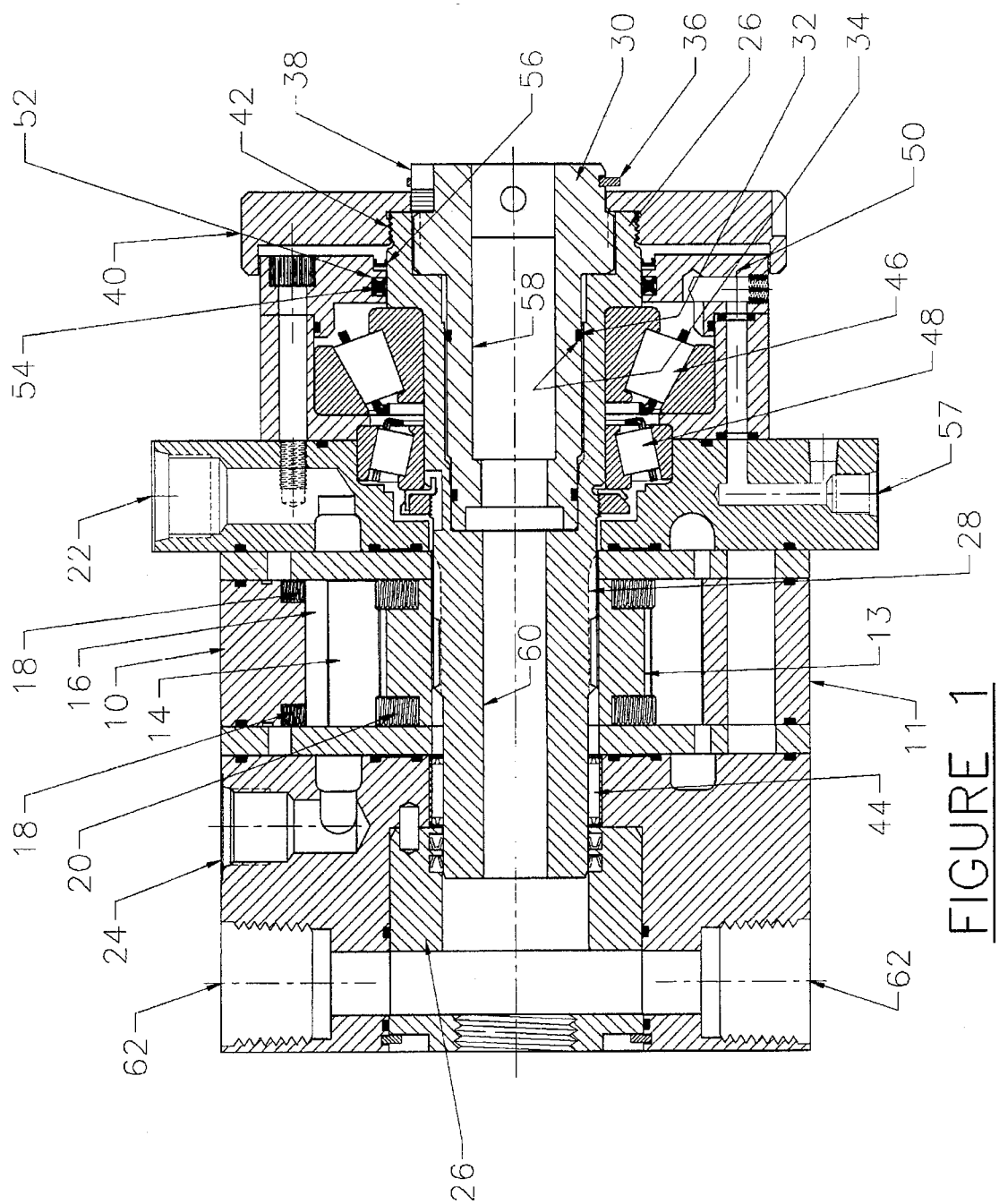
FIG. 1 is a cross-sectional view of a hydraulic motor in accordance with the prior art.
Figure 2:
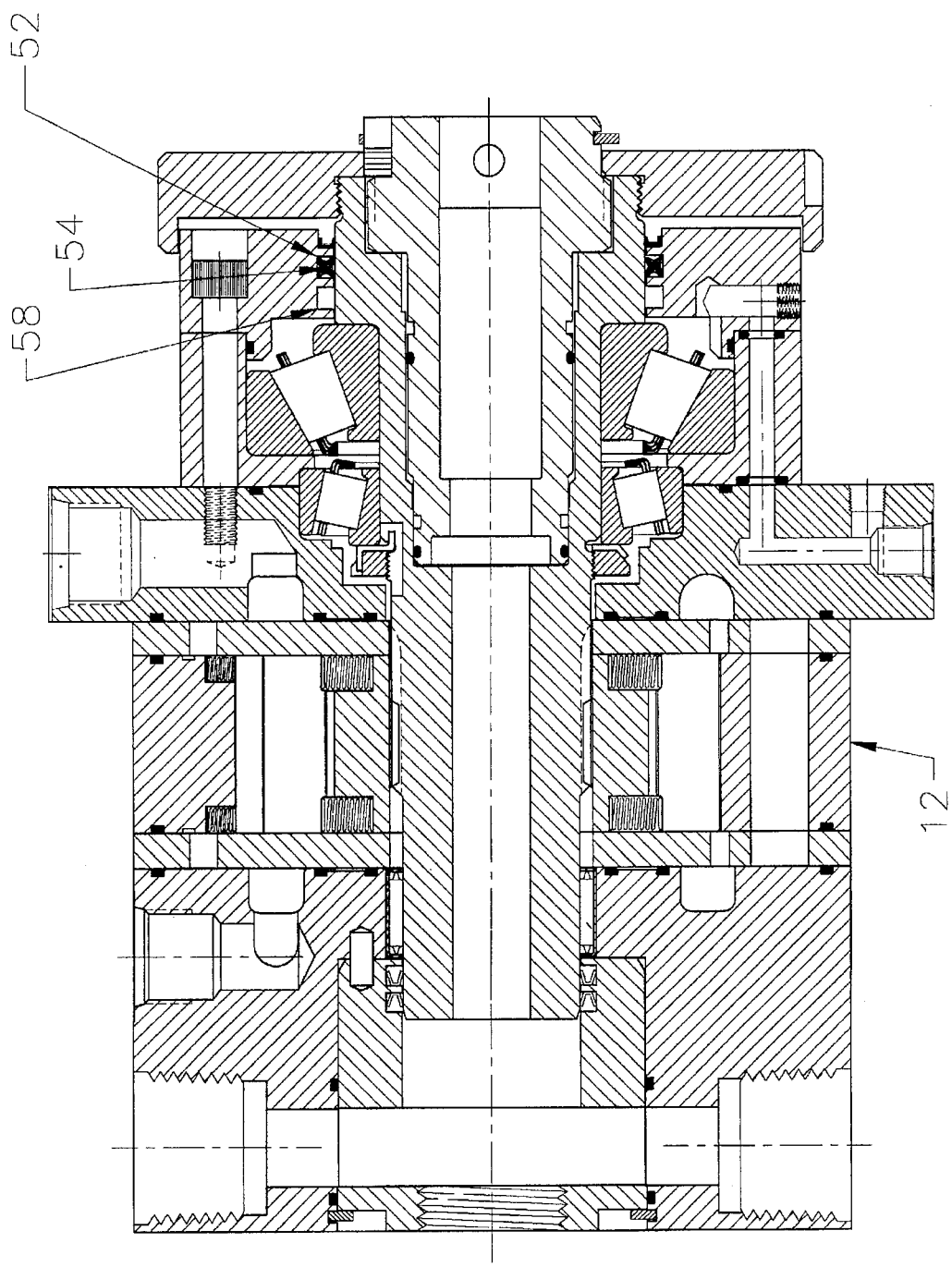
FIG. 2 is a cross-sectional view of a hydraulic motor in accordance with the present invention.

FIG. 1 depicts a hydraulic motor 10 as provided in the prior art, which hydraulic motor is adapted for use for drilling overhead holes in coal mines. FIG. 2 depicts a hydraulic motor 12 identical to hydraulic motor 10 but exhibiting the features of the invention. Parts of hydraulic motor 12 that are identical to parts of hydraulic motor 10 will be referenced with prime numbers that correspond to those of hydraulic motor 10.

Hydraulic motor 10 is of the double-vane type, comprising a stator 11 and a rotor 13. The rotor 13 exhibits vanes 14 which are biased by springs 20. The stator 11 exhibits vanes 16 which are biased by springs 18. The rotor 13 rotates axial by relative to the stator 11 as hydraulic fluid is driven through hydraulic fluid port 22, exiting from hydraulic fluid port 24.

Rotor 13 is locked to hollow shaft 26 by means of mating splines 28. Hollow shaft 26 receives a hollow chuck 30. Hollow chuck 30 has o-rings 32 displaced within grooves 34 and is locked within hollow shaft 26 with a lock ring 36 and keyway 38. Slinger 40 is attached to hollow shaft 26 by means of threads 42.

As rotor 13 rotates, hollow shaft 26, hollow chuck 30, and slinger 40 rotate. The rotation of hollow shaft 2,6 is facilitated by needle bearings 44 and Timken bearings 46 and 48. The hollow shaft 26 is adjacent to and rotates relative to a seal plate 50. Groove 52 within seal plate 50 receives quad ring seal 54, which communicates with both the seal plate 50 and hollow shaft 26, forming a seal therebetween. Seal 54 is protected by dust ring 56. The bearings 44, 46, and 48 and seal 54 are lubricated by a portion of the hydraulic fluid that drives the hydraulic motor 10, which portion leaks into the areas occupied by the foregoing bearings and seal, and drains from passageway 57.

In operation, a drill bit (not shown) is mounted in hollow chuck 30. Drill debris is displaced by the rotation of slinger 40 and is also drawn through the hollow portions 58 and 60 of the hollow chuck 30, hollow shaft 26, and vacuum ports 62. Over time, dust breaches the dust ring 56 and causes abrasion of the hollow shaft 26 at its point of contact with seal 54. Such abrasion will so wear the hollow shaft 26 at its point of contact with seal 54 that the seal affected by seal 54 is broken. Once the seal is so broken, hollow shaft 26 must be replaced or resurfaced.

FIG. 2 depicts the apparatus of FIG. 1, but exhibits the present invention. In addition to groove 52', hydraulic motor 12 exhibits a second groove 58. The existence of the second groove 58 effectively doubles the life of hollow shaft 26 by providing an alternate site for a seal similar to 54'. As seal 54' wears the hollow shaft 26 at a point of contact opposite groove 52' to a degree that breaches the seal made by seal 54', a seal can be placed in the groove 58. Opposite groove 58, hollow shaft 26 has no wear. Thus, a seal can there be effectively made.

It is undesirable to have seals within both grodves 52' and 58, because a first seal in groove 58 will prevent lubricating fluid from contacting a second ring in groove 52'. Absent lubricating fluid, a second seal in groove 52' will quickly disintegrate from the friction generated by the relative movement of the hollow shaft 26 and the seal plate 50.

The seal of the present invention may wear independently of the surface against which it abuts. For example, seal 54' may wear faster than the surface of hollow shaft 26 which lies in contact with quad ring seal. Accordingly, it may be desirable to replace seal 54' without moving the location of the replacing seal from groove 52' to groove 58. Accordingly, for purposes of the claims, "seal" includes replacement seals.

The instant invention is applicable in numerous apparatus having surfaces than move relative to a seal, and is particularly useful in apparatus that are subjected to abrasive dust. The preferred embodiment includes two grooves, but any plurality of grooves may be used in accordance with the invention.

In applications where there is excessive wear between the seal and the shaft, it would be of great advantage to provide multiple grooves in the seal plate, to provide additional areas of contact for the ring seal to seal against the shaft each time by moving to the next groove in the seal plate to be in contact with a unworn portion of the shaft. This would put the new ring seal in each instance in contact with the shaft with original shaft finish of compatible roughness required by the ring seal in use.

I claim:

1. A method of reducing wear within a mechanical apparatus having first and second adjacent, sealable surfaces which move relative to each other, one or both of the surfaces defining a plurality of adjacent grooves, comprising the steps of:

placing a seal within a first of the plurality of adjacent grooves whereby a seal is formed between the first and second adjacent surfaces while leaving an adjacent groove empty, when the seal fails removing the seal from the first of the plurality of adjacent grooves, and placing a seal in one of the adjacent grooves.

2. The method of claim 1 in which the first and second surfaces comprise concentric cylindrical surfaces.

3. The method of claim 2 in which the seal is a quad ring seal.

4. The method of claim i in which the movement of the first and second surfaces is in a direction parallel to the grooves.

5. The method of claim 2 in which the concentric cylindrical surfaces share an axis and rotate relative to each other about the axis.

\* \* \* \* \*